April 8, 1930.  F. I. DU PONT  1,753,335
STEAM POWER PLANT
Filed April 13, 1921   6 Sheets-Sheet 1

INVENTOR
Francis I. du Pont
BY
Frank L Busser
ATTORNEY.

INVENTOR
Francis I. du Pont
BY
Frank S. Busser
ATTORNEY.

April 8, 1930.  F. I. DU PONT  1,753,335
STEAM POWER PLANT
Filed April 13, 1921    6 Sheets-Sheet 3

WITNESS:

INVENTOR
Francis I. du Pont
BY
Frank S. Busser
ATTORNEY.

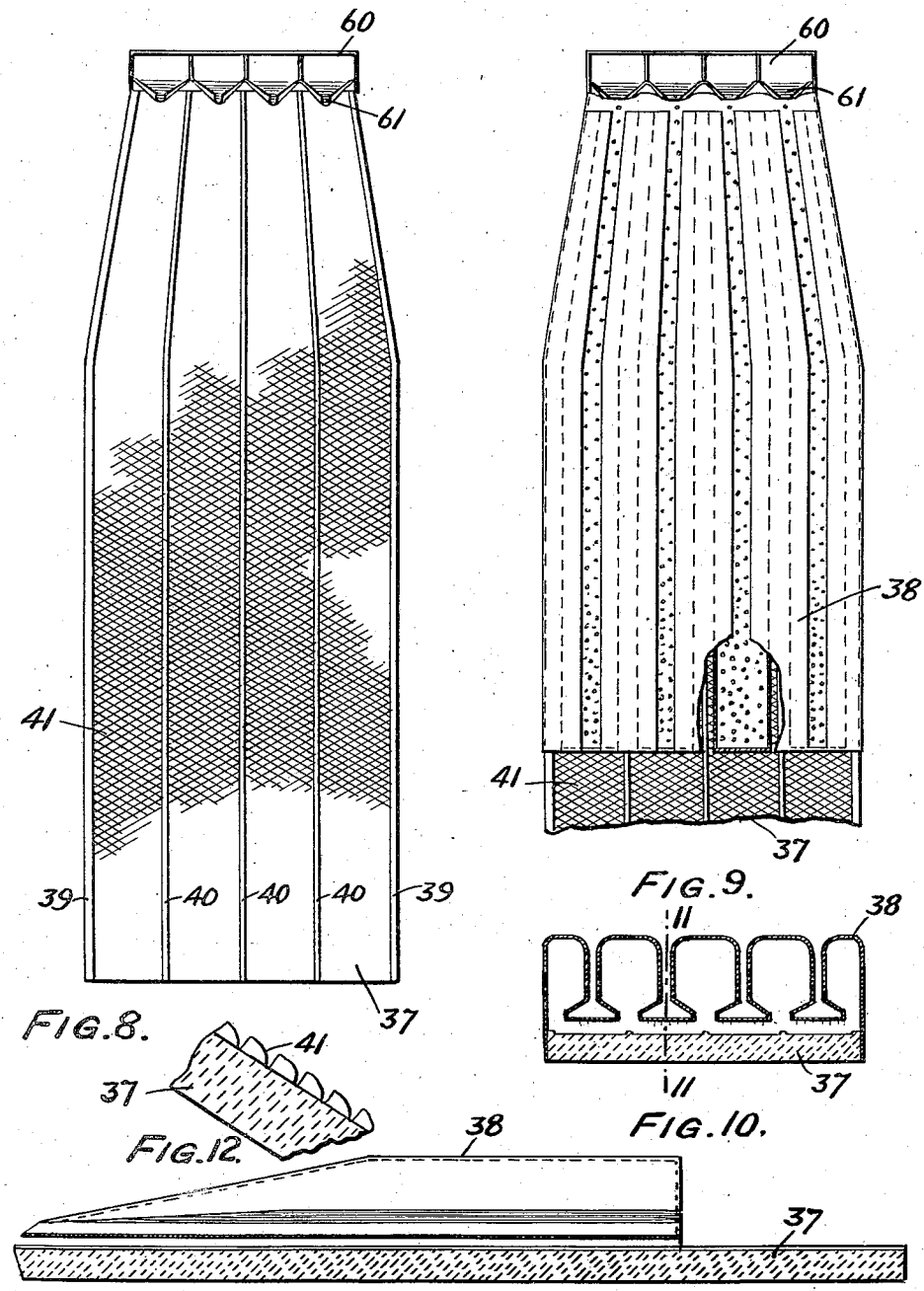

April 8, 1930.　　　　F. I. DU PONT　　　　1,753,335
STEAM POWER PLANT
Filed April 13, 1921　　　6 Sheets-Sheet 5
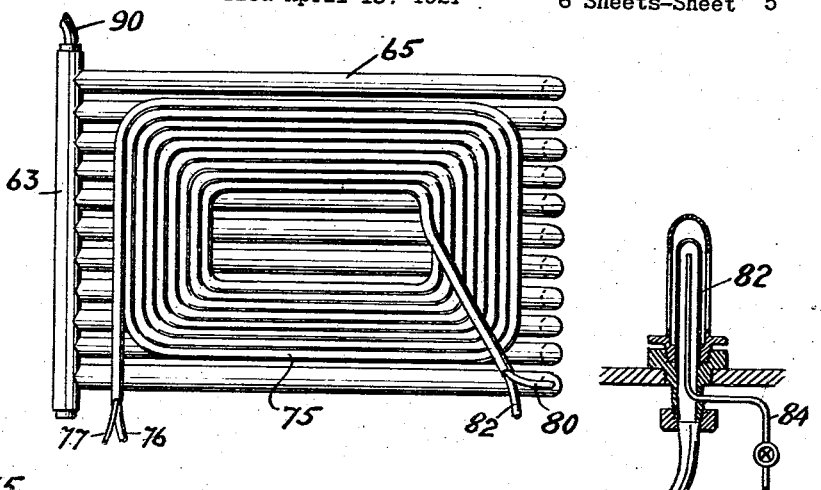
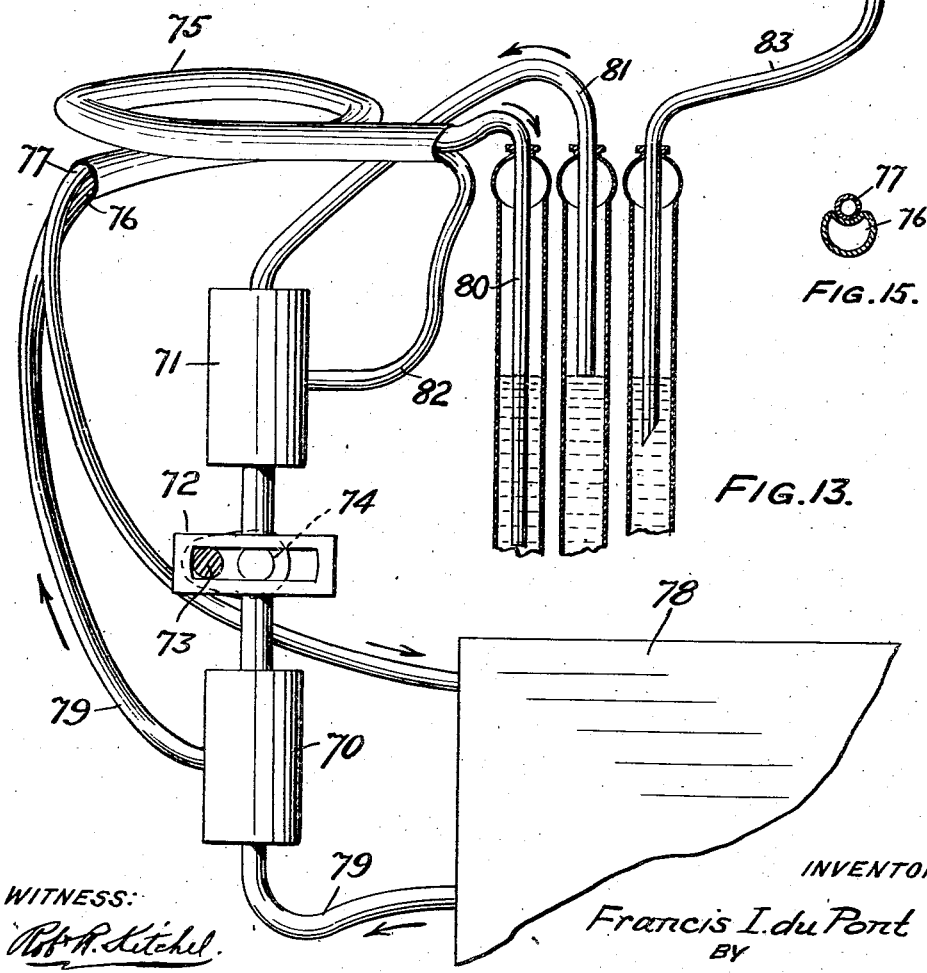
INVENTOR
Francis I. du Pont
BY
Frank S. Busser
ATTORNEY.

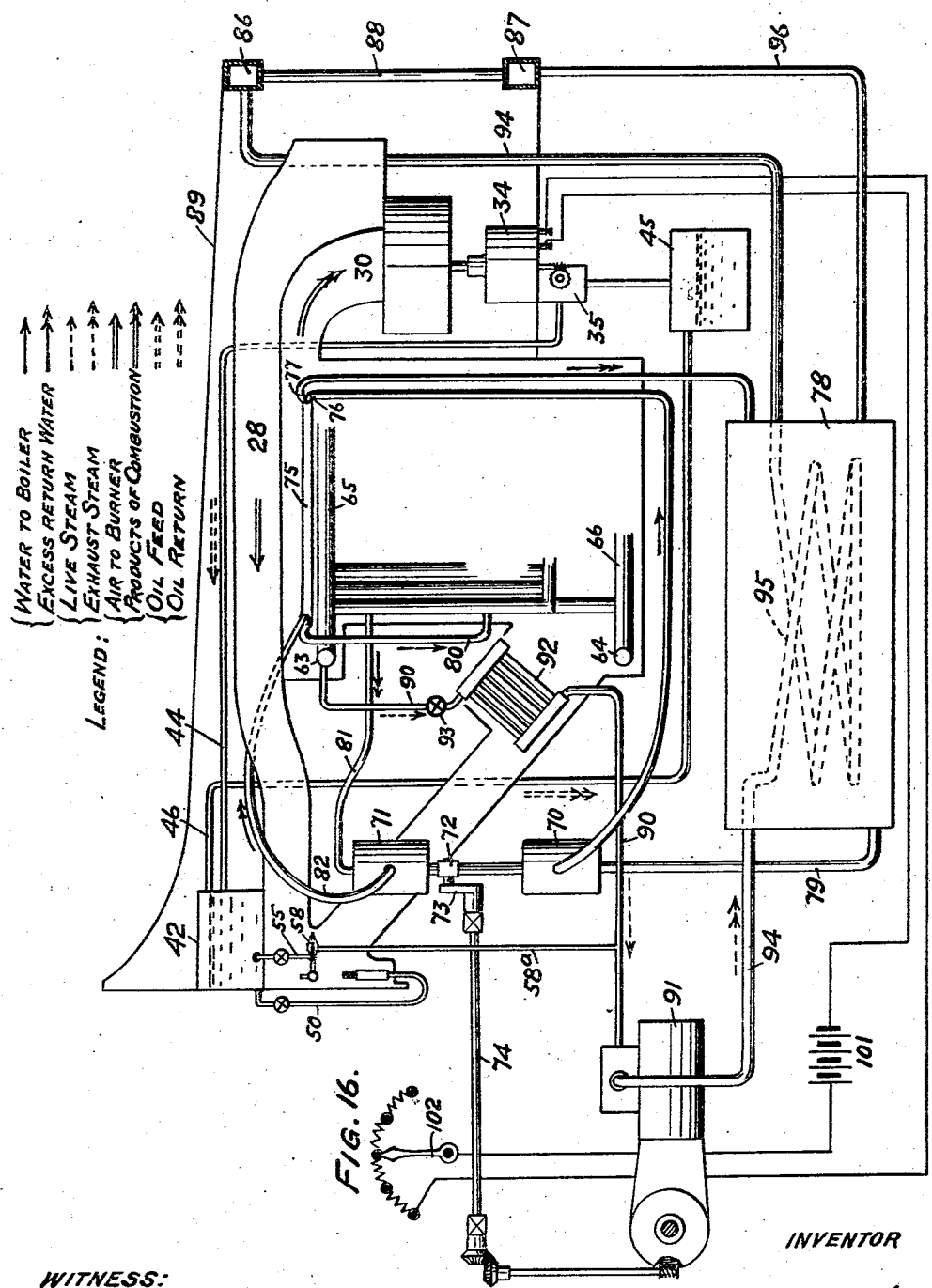

Patented Apr. 8, 1930

1,753,335

UNITED STATES PATENT OFFICE

FRANCIS I. DU PONT, OF WILMINGTON, DELAWARE, ASSIGNOR TO DELAWARE CHEMICAL ENGINEERING CO., OF WILMINGTON, DELAWARE, A CORPORATION OF DELAWARE

STEAM-POWER PLANT

Application filed April 13, 1921. Serial No. 460,996.

This invention relates to an improvement in steam power plants, and more particularly to a steam power plant for automobiles.

One of the objects of my invention is to provide a compact plant of this character which can readily be controlled by the driver with very few control devices.

Another object of the invention is to provide a system in which the water level in the steam generator or vaporizer is maintained constant regardless of the steam consumption, by continuously supplying a greater amount of water to the vaporizer than is required for the maximum load and continuously withdrawing the excess water supplied to the vaporizer and returning it to the water supply reservoir, and thereby conserve the supply of water; and during the return of the water, extract the heat therein and transfer said heat to the water passing to the vaporizer, to prevent the loss of the heat contained in the excess water and to raise the temperature of the ingoing water.

A further object of my invention is to provide a heating system for the vaporizer adapted for burning kerosene and in which a constant head of oil is maintained as well as a constant air supply; and in which the ingoing air is partially heated by the outgoing waste products of combustion.

A further object of my invention is to conserve the water and heat contained in the exhaust steam and return it to the water supply after passing it through a condenser, and cooling the condenser by passing over the surface thereof the air for the heating system to assist in raising the temperature of the latter.

Another object of my invention is to provide a construction wherein the fuel burner is so located and arranged that it may be observed by the driver without changing his position, and without the opening of a furnace door, while the direction of the flow of air to the combustion chamber is such as to carry the heat of the furnace away from the driver.

Another object of my invention is to provide means for feeding the fuel to the combustion chamber and along said chamber by gravity and at the same time provide means for preventing the oil from rapidly flowing to the lowest point on the hearth, so that the oil will be vaporized before it reaches the lowest portion of the furnace.

Another object of my invention is to provide a hearth of fire proof absorbing material which will absorb the oil to a certain extent and give it off in the form of gas, which will prevent the carbonization thereof by the heat in the combustion chamber; and also to insure a substantially uniform distribution of the evolved gas throughout the entire hearth area.

Another object of my invention is to provide a plurality of sets of fuel feeding nozzles and independent control valves therefor, the nozzles of each set being spaced across the entire front of the combustion chamber so that the oil will be equally distributed over the inlet to the combustion chamber, regardless of whether either or both sets of nozzles are open to the oil supply.

Another object of my invention is to provide means for feeding air to the combustion chamber along the major portion of its length and passing said air over the top or cover of the combustion chamber and through said cover to heat the air to a high temperature before it passes to the combustion chamber and at the same time prevent the overheating of the combustion chamber cover.

Another object of my invention is to provide a vaporizer built up of sections of steel tubing in such manner that the vaporizer will withstand a very high pressure without providing excessively thick walls, as well as a structure in which the sections of tubings can be welded to each other at their joints to form a substantially homogeneous, integral and flexible structure, which will withstand a high temperature and pressure without danger of opening up the joints.

Another object of my invention is to so construct the vaporizer as to form a secondary combustion chamber in the lower portion of the structure which will be substantially enclosed by the tubes of the vaporizer and which will be in direct communication with the outlet end of the combustion chamber of the oil burner.

Another object of my invention is to provide a steam superheater or drier in the combustion chamber in the direct path of the hot products of combustion to insure the delivery of dry steam to the engine.

Still another object of my invention is the provision of a long, flexible, composite, tubular heat interchanger, adapted to be coiled up in a space above the vaporizer and in the direct path of the outgoing waste gases, whereby insulation of the interchanger is rendered unnecessary, and whereby the interchanger will act to a certain extent as a fuel economizer by absorbing some of the heat from the waste furnace gases and transferring said heat to the ingoing feed water.

A still further and the main object of my invention is the provision of a compact steam plant for automobiles, in which the inherent waste heat in a system of this type is substantially all reabsorbed and returned to the system through the circulating water system and the air supply, with the exception of the heat contained in the cooled waste products of combustion and the heat lost by radiation to the surrounding atmosphere exterior of the plant.

The nature of my invention will be best understood by reference to the accompanying drawings which will now be described, it being premised, however, that various changes may be made in the details of construction, as well as the arrangement of the parts, without departing from the spirit and scope of my invention as defined in the appended claim.

Fig. 1 of the drawings is a longitudinal sectional view through one form of plant built in accordance with my invention, and in which I show the invention applied to an automobile.

Fig. 8, is a plan view of the furnace hearth.

Fig. 9, is a similar view with the hearth cover in position.

Fig. 10, is a transverse sectional view through the hearth and cover shown in Fig. 9.

Fig. 11, is a longitudinal sectional view on the line 11—11 of Fig. 10.

Fig. 12, is a longitudinal sectional view on a large scale of a portion of the hearth.

Fig. 13, is a diagram showing the feed water connections.

Fig. 14, is a plan view of the generator or boiler with the heat interchanger coiled on the top thereof.

Fig. 15, is a detail sectional view through one coil of the interchanger.

Fig. 16, is a diagram illustrating the various steam, water, air, oil and electrical connections.

Figure 1:
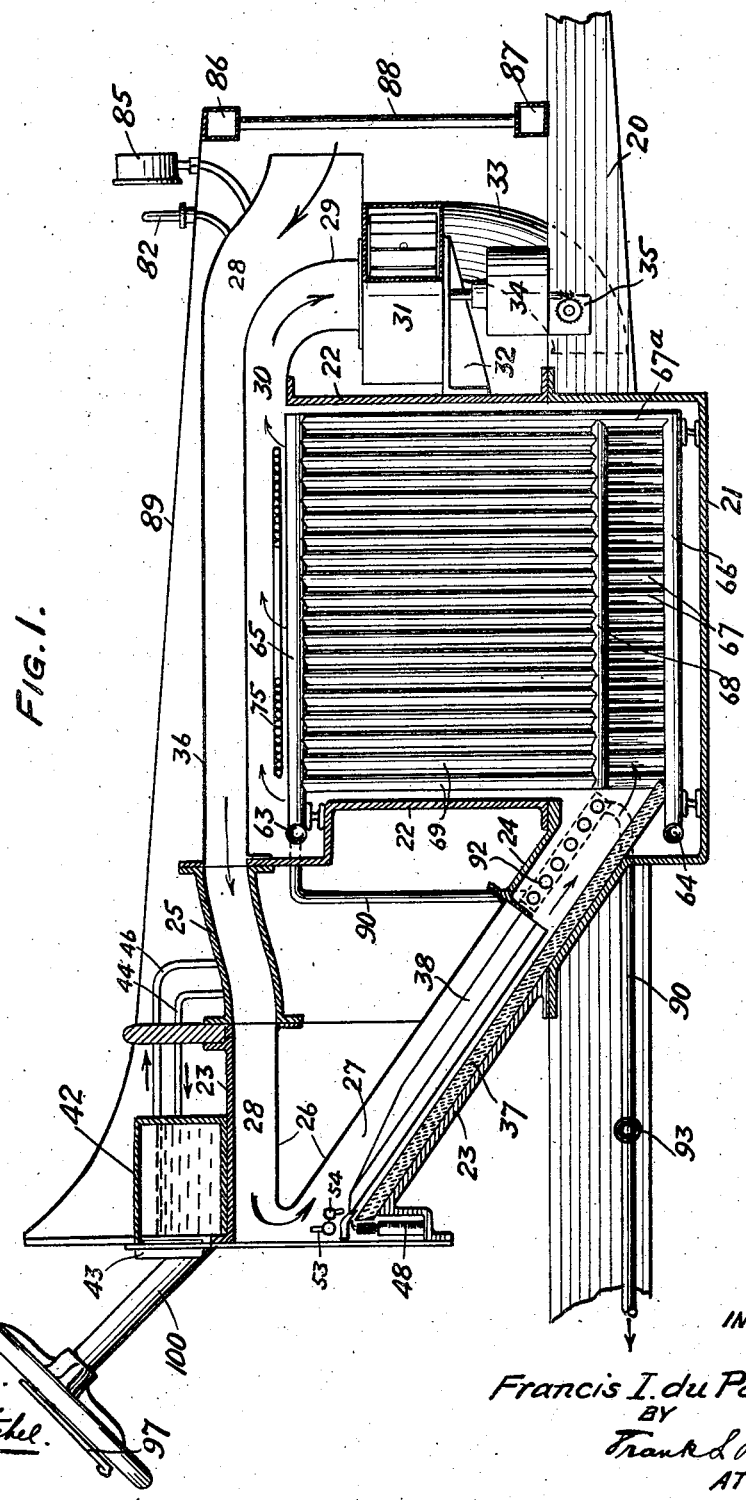
Figure 2:
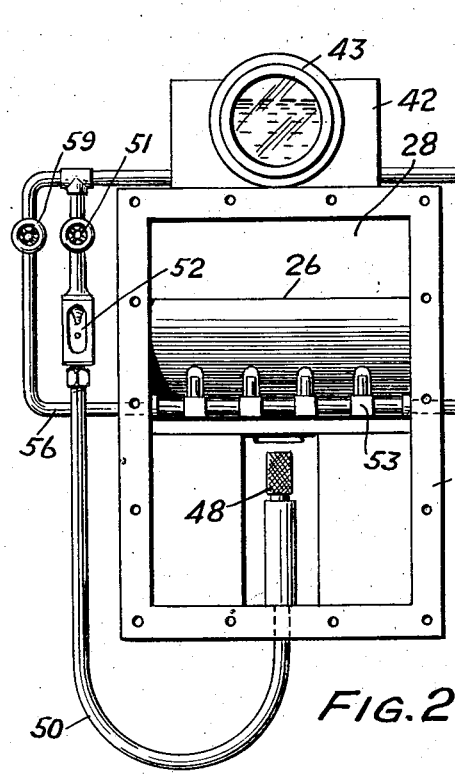
Fig. 2 is a face view of the burner or furnace and the oil supply tank, with the burner cover plate removed.

In these drawings the reference character 20 designates the chassis of the automobile, to which is connected the generator supporting and casing section 21, and to which are connected the side and end casing plates 22, 23, and 24 are the burner or furnace casing members, which are also supported by the casing section member 21. 25 is an air duct casting connected to the rear end plate 22 of the generator casing and the burner casing member 23. 26 is a sheet metal member connected at one end to the member 25 and at the other end to the member 24, while the side edges thereof are secured to the side portions of the member 23, to form the air chamber 27 of the burner and a portion of the air duct 28. Supported on the side and end generating casing plates 22 is a sheet metal structure 29, which forms the cover for the generator casing and the outlet duct 30 for the waste products of combustion. The end of the conduit 30 is connected to the casing 31, of an exhaust fan, which is supported on a bracket 32 connected to the end casing plate 22. 33 are outlet ducts from the fan casing which extend downwardly and backwardly therefrom. 34 is an electric motor connected to the exhaust fan and an oil pump 35 and is arranged to be driven from a suitable source of energy, as hereinafter described.

Supported above the sheet metal structure 29 is a second sheet metal structure 36, which is also connected at one end to the air duct casting 25, and forms a continuation of the air duct 28. The front end of this structure is open to permit the admission of air to the duct.

Figure 3:
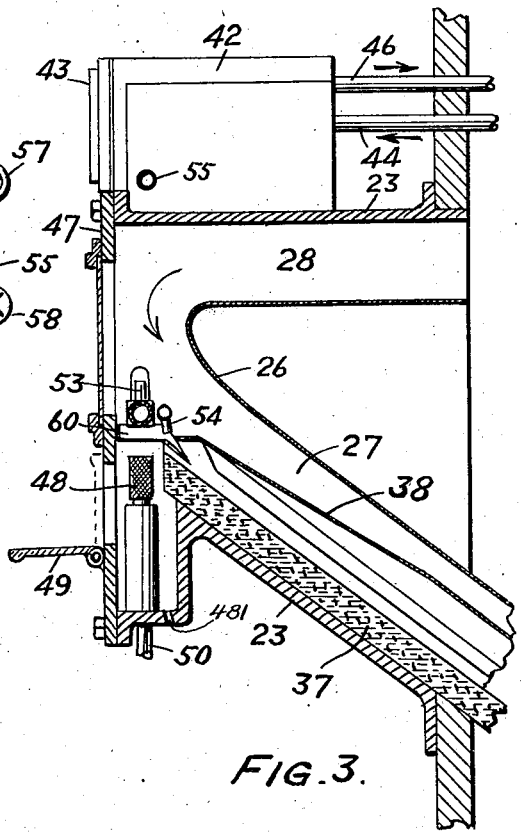
Fig. 3, is a longitudinal sectional view through a portion of the burner or furnace, on a larger scale than that shown in Fig. 1.
Figure 4:
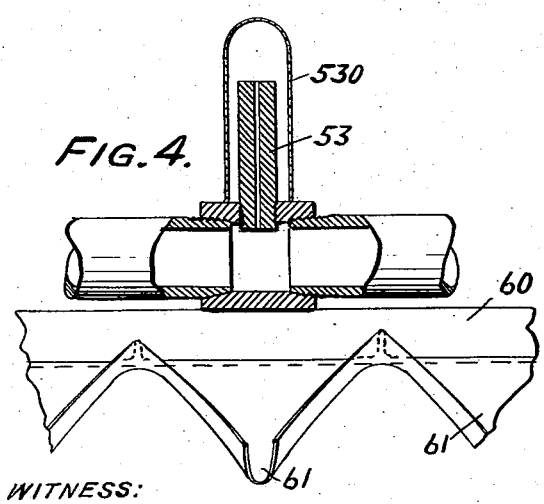
Figs. 4 and 5, are detail sectional views of the oil feeding device for the burner.
Figure 5:
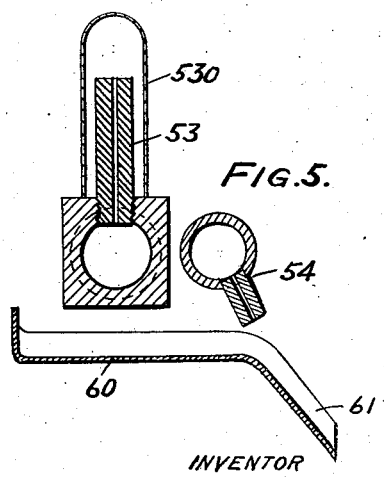
Figure 6:
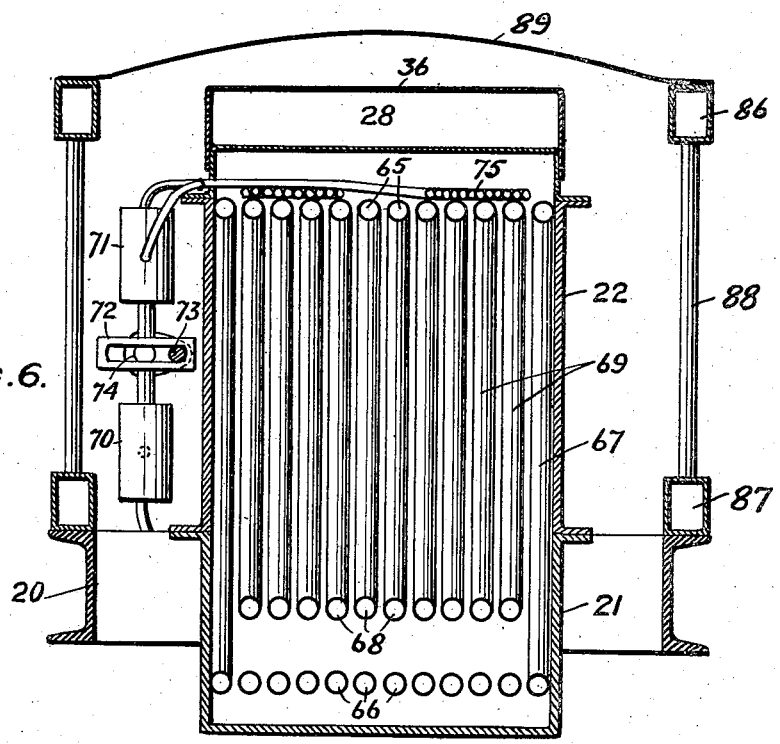
Fig. 6, is a transverse sectional view through Fig. 1.
Figure 7:
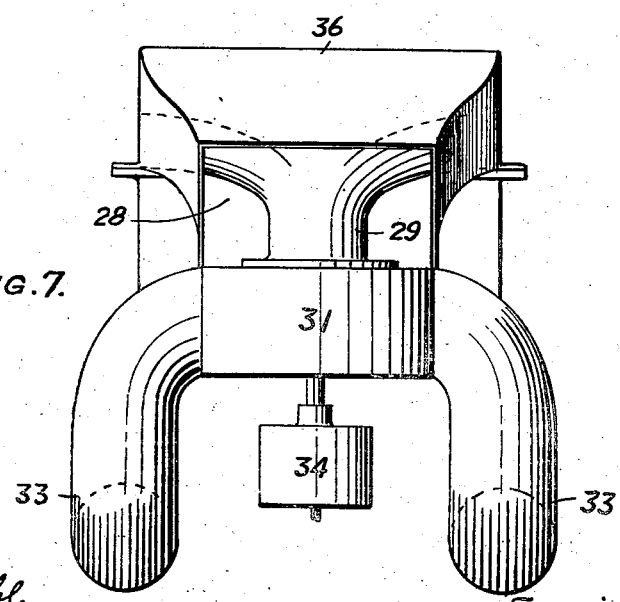
Fig. 7 is a front view of the air supply duct structures and the duct for the waste products of combustion.

The burner or furnace is inclined to the horizontal, as shown in Figs. 1 and 3, and is provided with a hearth 37 formed of compressed asbestos fiber, and is supported on the members 21 and 23. The hearth extends from the upper end of the burner forwardly and downwardly into what may be termed the secondary combustion chamber within the generator casing. The primary combustion chamber is formed between the face of the hearth and a cover plate 38, which separates the main combustion chamber from the air chamber 27 within the burner.

The hearth 37 is provided with upwardly extending longitudinal edge ribs 39, and similarly disposed intermediate ribs 40, there being four oil flow channels formed between said ribs. The upper face or the hearth is provided with diamond shaped projections 41. The two faces of each projection which extend toward the inlet end of the burner are substantially normal to the plane of the hearth, while the other faces thereof are at an angle thereto, to form diagonally disposed intersecting grooves having sloping walls; the grooves being arranged to cause the oil to flow in a zigzag manner downwardly in each channel and across the entire face of the hearth, to evenly distribute the oil and also to prevent the oil from rapidly flowing from the top to the bottom of the hearth.

The longitudinal ribs 40 are not essential where the burner is maintained stationary, but where the burner is used in connection with a steam power plant, on a vehicle or on a boat, the ribs 40 prevent the oil flowing bodily over to one side in case of rocking of the boat or the travel of a vehicle over a transversely sloping surface.

The hearth cover plate 38 is provided with T-shaped air channels in communication with the air chamber 27 which are arranged alternately with relatively large flame passages above the hearth which form the primary combustion chamber. The bottoms of these air channels are perforated from end to end, but the perforations at the upper end are smaller and somewhat less numerous than at the lower end. This is because the rate of vaporization of the liquid fuel is less rapid at the upper end and it is desired to admit air not in proportion to the fuel flowing down the hearth, but only in proportion to that part of the fuel vaporized at any given point. As the fuel travels further down it encounters zones of greater heat and a large proportion is vaporized and therefore more air is required. Hence the provision of more or less gradual increase in the size and number of the perforations from the upper end to the lower end.

Since the volume of flame, that is: of burning vapors, increases as the fuel progresses down the hearth, and since it is important that this increasing volume shall not interfere with the proper mixing of fresh air with vapor being newly generated on the lower parts of the hearth, flame passages of increasing size are provided. The function of these flame passages is to get the burning vapor, which already has its proper amount of air, out of the way so as to not obstruct the more delicate process of mixing the new air with new vapor. These flame passages, particularly at their lower ends, become red hot, and as the air which has to pass into the air channels must pass along and around these flame passages, it becomes highly preheated by absorbing heat therefrom; all of which makes for efficient combustion.

This absorption of heat will be sufficient to prevent said plate becoming heated to the point of fusion.

I prefer to form the hearth of compressed asbestos pulp, so as to form a structure which is fire proof, as well as a structure which will absorb the oil and give it off in the form of gas. This absorbent quality, together with the surface formation, will prevent the oil from flowing into the secondary combustion chamber, as the oil will all be absorbed by the hearth before this point is reached. In order to prevent the oil from passing through the hearth and thence to the secondary combustion chamber between the hearth and the members 21 and 37, I preferably coat the bottom face and edges of the hearth with silicate of soda, to form a coating which is impervious to oil, and thereby prevent any oil passing through the hearth.

The hearth cover plate 38 is preferably formed of nickel or any other metal which will withstand high temperature without fusing or oxidizing.

Mounted on the burner casing member 23 is an oil supply reservoir 42 having a front plate 43, and a glass plate therein, through which the driver can see the oil in the reservoir. 44 is an oil feed pipe extending from the pump 35 for delivering oil from an oil supply tank 45 suitably supported from the chassis of the automobile. As the pump 35 is continuously driven by the motor 34 when the burner is in operation, and is of greater capacity than required to supply oil for the maximum oil feed to the burner, I provide an oil return pipe 46 for returning the excess oil to the tank 45. By this arrangement I am assured of a constant oil supply for the burner and which supply is maintained under a constant head.

The front of the burner is closed by means of a front plate 47, which is bolted to the front flanges of the casing member 23, and which front plate is provided with a transparent plate through which the driver can look into the burner. 48 is a pilot light seated in a recess in the front part of the burner and to which access can be obtained through a small door 49 hinged to the front plate 47. There are provided draft holes 481 of sufficient size to admit just enough air for the pilot 48.

The pilot light is supplied with fuel from the tank 42 through a pipe 50 having a valve 51 for controlling the feed of oil and a sight tube 52 through which the feed can be observed.

The oil for the burner proper is supplied to the burner by means of a main set of four jets 53 and a set of four auxiliary jets 54, which are supplied with oil from the reservoir 42 through the pipes 55 and 56, respectively. The pipe 55 is provided with a control valve 57 and a pressure controlled valve 58, which is connected to the generator or steam line therefrom by means of a pipe 58ª and is arranged to cut off the supply of fuel to the main jets when the pressure in the generator reaches a predetermined limit. The feed pipe 56 is also provided with a valve 59 for controlling the flow of oil to the auxiliary oil jets 54. Mounted within the casing member 23 below the oil jets is an oil receiving pan 60, having four compartments, there being a compartment below each pair of jets, namely: a main jet and an auxiliary jet, to receive the oil from said jets, and extending from each pan compartment is a downwardly inclined tapered spout 61, each spout being arranged to deliver oil from a pair of jets to the center of a channel on the hearth. The pilot light 48, which is placed below the pan 60 is situated centrally between the two intermediate spouts, so that the flame therefrom is drawn onto the hearth between said intermediate spouts by the exhaust fan.

In the drawings I have shown two types of jets, the auxiliary jets 54 merely comprising short tubes opening into a common header and which tubes are directed downwardly toward the pan 60. The auxiliary jets 54 and the control valve 59 in pipe 56 are so proportioned that when valve 59 is fully opened, the quantity of oil delivered to the hearth will only be sufficient to keep up steam without materially increasing the pressure. In other words, the heat generated by oil from the auxiliary jets is merely sufficient to compensate for heat lost by radiation, so that the steam pressure can be maintained if desired, when the engine 91 is idle, without danger of generating an excessive pressure in the generator when no steam is drawn from the generator.

The main jets are of such a size, however, that they will allow to flow down the hearth the full amount of oil required for combustion when the burner is working full capacity. As, under these circumstances, the oil feed from these jets is rather heavy and as, to prevent sediment from clogging the jets, it is desirable to turn them upward, I provide each jet with a cover 530, to prevent the oil from squirting into space.

The main jets comprise an upwardly extending tube and the tubular cover 530 closed at the upper end, the lower end thereof merely resting on a coupling between nipples, which couplings and nipples form a manifold for the four jets. As the covers for the jets merely rest on the couplings the oil will flow out around the bottom and into the pan 60.

The multiple jet 53 and also the multiple jet 54 are not required where the burner is in a stationary position. One jet would distribute perfectly well throughout the entire hearth, provided the ribs 40 were eliminated, but on a vehicle or boat, where the burner would be frequently tilted sidewise, making it advisable, as hereinbefore explained, to provide such ribs, the provision of a jet for each channel formed between adjacent ribs is required.

The generator is built up of a plurality of different sections which are connected to transverse headers at their upper and lower ends, while each section is built up of a plurality of longitudinal headers and a plurality of vertical tubes, welded to each other at the joints, to form a somewhat flexible, homogeneous and integral structure.

63 is the upper transverse header and 64 the lower transverse header, to which are connected the upper and lower longitudinal headers 65 and 66, respectively, of each section. The two outer or side sections are provided with vertical tubes 67, which extend from header 65 to header 66. Each of the remainder or intermediate sections is provided with only such long tube 67ª, which extends from the upper head 65 to the lower header 66 at the rear of the boiler structure and at the front of the automobile, each intermediate section is also provided with intermediate longitudinal header 68, connected at one end to the tube 67ª, and the remaining vertical tubes 69 of the intermediate sections are connected to their upper headers 65 and the intermediate headers 68. This forms a secondary combustion chamber open at the front end to the burner combustion chamber, and which is bounded on the bottom by the headers 66, the top by intermediate headers 68, the rear end by the tubes 67ª, and the sides by the tubes 67. As the generator is formed entirely of short sections of relatively thin gauge, seamless steel tubing, the water in the generator will be rapidly heated and a high pressure can be maintained without danger of an explosion.

The entire interior of the walls of the generator casing are lined with asbestos to retain the heat within the casing and for protecting the walls from the direct action of the flame from the burner.

Mounted on the side of the generator casing is a feed water pump 70 of sufficient capacity to deliver more than the maximum amount of water required, and a measuring engine or combined pump and engine, 71 for continually removing the excess water delivered to the generator, to maintain a constant level of water in the generator regardless of the steam consumption.

The piston rod of the feed pump and the water remover are connected to a yoke 72 which is arranged to be reciprocated by a crank 73 on a shaft 74 geared to the driving engine, so that the feed pump and water remover are continuously driven when the engine is driven.

In the drawings I have merely illustrated one feed pump and one water remover, but in the device I have constructed and tested I have used a plurality of such devices, and prefer to use three pumps and three water removers set 120° from each other so as to maintain a continuous circulation through the system.

Coiled on the top of the generator and in the path of the outgoing products of combustion is a heat interchanger 75 which is formed of two tubular members 76 and 77 brazed or so otherwise secured to each other as shown in Fig. 15 as to conduct the heat from the one to the other. The feed water is pumped from the supply tank 78 by means of the pump 70 through pipe 79, large tube 76 of the interchanger, and pipe 80 to the generator. Leading from the generator to the measuring engine or excess water remover 71 is a pipe 81, and 82' is a pipe leading from the excess water remover 71 to the one end of the small tube 77 of the heat interchanger, the other end of said tube 77 being connected to the water supply tank 78.

In the normal operation of the device, water is continually pumped from the supply tank 78 to the generator at a rate in excess of the maximum demand for steam for the engine, and the excess water is continually returned to the supply tank through the interchanger, so that the level of the water will be maintained on a line with the inlet end of pipe 81. The capacity of the measuring engine 71 is substantially equal to or greater than that of the pump 70, so that for each complete stroke of these devices a predetermined volume of water will be delivered to the generator, and a predetermined volume of water or water and steam will be removed from the generator and returned to the tank.

The interchanger is located in a position in the system where, being immersed in the heated waste gases, it will not need to be insulated, and as the cross-sectional area of the return water tube 77 is relatively small and about 50 feet in length, or of sufficient length to resist the movement of the return fluid, so that the mechanical energy contained in said fluid by reason of its high pressure will be converted into heat by overcoming said resistance and the heat will be absorbed by the ingoing water which passes through the interchanger in the reverse direction to the flow of excess fluid. The length of the interchanger and diameter of the tube 77 are such that sufficient heat is absorbed by the ingoing water, to thereby overcome any danger of the return water flashing into steam when entering the water supply tank, and thereby uselessly losing the heat and mechanical energy in said return water. As the area of the feed water tube 76 of the interchanger is relatively large the water will not be resisted in its movement therethrough and its movement will also be relatively slow, so that it will absorb substantially all of the heat from the outgoing water before it enters the generator.

82 is a water gauge mounted on a stationary or fixed portion of the hood and having a sight glass closed at one end, while the other end is in communication with the generator by means of a pipe 83. The end of this pipe is cut off at an acute angle and is somewhat below the normal water level, but above the level to which the water can fall without danger. Connected to the upper end of the sight tube is a tube 84 having a valve which is arranged to permit the air to pass from the tube and allow the water to fill the tube. The provision of this tube is, however, merely preferential, as, under high steam pressure, the amount of air that would be forced to the top of the tube would be relatively small. If the water should fall below the end of the pipe 83 steam will enter the pipe and permit the water therein to pass to the generator. After the water has again risen above the lower end of the pipe it rises at once filling the sight tube by reason of the steam therein condensing. As the lower end of the pipe 83 is cut at an acute angle there is no danger of the water being trapped in the sight tube by means of a globule sealing the lower end of the pipe 83 if the water should fall below the end thereof.

85 is a steam gauge which is also mounted on a fixed portion of the hood, and is connected to the generator.

I preferably locate the water and steam gauges at the front of the hood so they will be in the direct line of vision of the driver.

86 and 87 are the upper and lower headers of the condenser which extend along the front and both sides of the automobile in front of the dash and are connected to each other by vertical tubes 88 relatively close to each other to provide the maximum amount of radiating surface, and to cause the air to pass in thin strata to the space under the hood 89. The hood is carried by the condenser so as to be removed with the condenser when the condenser is removed for the inspection of parts enclosed by the condenser.

90 is the live steam pipe leading from the steam space of the generator to the engine 91, and included in the live steam line is a superheater or steam drier 92, which is located in a space in the burner between the main combustion chamber, and the secondary combustion chamber, and 93 is a throttle valve in the live steam line between the superheater and the engine. The exhaust pipe 94 from the engine is connected to one end of a coil 95 within the supply tank, while the other end thereof is connected to the condenser, which is also connected with the supply tank 78 by means of a return pipe 96, for the water of condensation.

97 is a control lever mounted on the steering column 100, and which lever is connected to the throttle valve 93, for controlling the admission of steam to the engine 91.

101 is a source of electrical energy which is connected in series with the motor 34 and a rheostat 102, for controlling the speed of the motor, to control the speed of the fan, and consequently control the air passing to the burner.

In the operation of the plant just described, and assuming that the proper quantity of water is in the generator, valve 51 is first opened to supply oil to the pilot light 48 which is then ignited, valve 59 or 57 is then opened to supply a quantity of oil to the pan 60 which is allowed to trickle down the channels on the hearth and the circuit is closed through the motor 34 to continuously pump oil to the reservoir 42 and to draw air through the air conduit 28 to supply air to the combustion chamber over the hearth. The flame from the pilot light will immediately ignite the fuel on the hearth the projections of which will function as wicks, and after the fuel has been ignited the cover plate 38 will soon become heated, which will in turn heat the air so that the burner will soon generate a high heat. The valve 59 may now be left wide open as the amount of oil delivered by the auxiliary jets should not be sufficient to raise a high pressure in the generator. The capacity of the jets and the capacity of the fan at the reduced speed having been predetermined relatively to each other, the mixture of fuel and air will be such as to maintain the heat in the generator so that when power is not being used a steam pressure will be maintained.

To get up steam quickly the valve 57 can be opened and the rheostat 102 adjusted to give the fan its full speed, when the main jets will go into service and steam quickly raised.

The steam when passing through the superheater will be heated sufficiently to evaporate all moisture so as to deliver dry steam to the engine. The exhaust steam will pass from the engine to the supply tank through the coil 95 in the tank 78 and then through the condenser. The exhaust steam in its passage through the coil 95 will transfer its heat to the supply water in the tank until this reaches the boiling point and then pass into the condenser in which it will be condensed by contact with the walls of the tubes 88 which are cooled by the air passing over the tubes.

The exhaust fan will cause the air to rush into the air duct and absorb a considerable amount of heat from the outgoing products of combustion through the sheet metal surface 29. The partially heated air then passes through the air chamber 27 into the combustion chamber, and is heated to a high temperature in the air chamber as it passes to the combustion chamber.

The hot products of combustion are sucked into the secondary combustion chamber in the generator and up over the generator tubes as well as the upper and intermediate headers and out through the outlet ducts, and fan chamber. A large portion of the heat in waste products of combustion is absorbed by the division wall between the air inlet duct and the waste outlet duct which is reabsorbed by the ingoing air.

Feed water is continually pumped into the boiler at a rate which is in direct proportion to the speed of the engine and the excess water is removed from the generator as fast as delivered thereto and is returned to the supply tank through the interchanger in which its heat is transferred to the ingoing water.

If the pressure in the generator should exceed the point at which the pressure control valve 58 is set, the valve will be closed and shut off the supply of oil to the main jets 53, and as soon as the pressure in the generator falls below a predetermined point the valve will again automatically open to feed oil to the main jets. As the feed to the pilot light is always maintained constant, and if desired, the feed to the auxiliary jets there will be no danger of flooding the burner when the pressure control valve 58 is automatically opened.

If it is desired to leave the automobile stand for a short or long period, the valve 57 is closed and the valves 51 and 59 left open to supply a small flow of oil to the burner to maintain sufficient fire in the burner to keep up steam in the generator but not to materially increase the pressure. Under these conditions the automobile can be immediately started after standing a long time.

The advantages of my invention result from the provision of a compact plant of this character which is not only adapted to be confined in a relatively small space, but which is also so arranged that the major portion of the heat radiated from the system is reabsorbed by the ingoing air for suporting combustion, while the excess water withdrawn from the generator and the water or condensation together with the heat contained therein are returned to the feed water system, and thereby conserving both water and heat.

A further advantage results from the provision of means for transferring the heat from the excess water to the ingoing water, whereby the excess water is resisted in its movement from the generator to the tank so that the mechanical energy contained in said excess water is converted into heat and transferred to the ingoing water and which latter will cool the excess water to such an extent before it reaches the supply tank that the danger of the water flashing into steam on entering the tank is overcome.

A still further advantage results from the provision of a flexible exchanger adapted to be coiled in a suitable space and formed of a composite tube having a small opening therethrough for resisting the movement of the outgoing water and a relatively large opening for the ingoing water to prevent friction and to cause the water to slowly pass therethrough to absorb the heat from the outgoing water.

A still further advantage results from the provision of a liquid fuel burner or furnace having a combustion chamber which is downwardly and forwardly inclined from the driver's station, so that the liquid fuel can be delivered by gravity and flow from one end toward the other and at the same time make the front end thereof containing the pilot or igniter accessible to the driver; and also from the location of the air admission end to the burner so that the heat is carried forward away from the driver into the combustion chamber of the generator. This arrangement also causes the hot gases or products to be moved in a reverse direction from the incoming air for supporting combustion so that the heat radiated from the generator will be taken up by the ingoing air to preliminarily heat the air.

A further advantage results from the provision of a hearth formed of fireproof absorbing material which will absorb the liquid fuel and give it off in the form of gas, and which will also prevent the fuel flowing to the lowest point of the combustion chamber, as the oil will all be absorbed and vaporized before this point is reached. The surface of the hearth is also provided with diagonally disposed intersecting grooves, which are arranged to cause the liquid fuel to flow in a zigzag manner over the surface of the hearth to equally distribute the fuel and also to break up the stream; and also from the provision of means for feeding a plurality of spaced liquid fuel streams to the hearth across the width thereof, together with means for preventing the streams from commingling, whereby an even distribution of fuel can be maintained across the full width of the hearth.

Another advantage results from the provision of a liquid fuel burner or furnace having an air chamber separated from the hearth by means of a covering having perforations therethrough throughout its length, through which perforations the air passes to the point of combustion, whereby I am enabled to distribute the air over the entire hearth in such a manner that the air needed for combination with the vaporizing fuel will be supplied approximately in proportion as vapor is generated in each zone of the descending hearth, and at the same time highly heat the air before it is admitted to the combustion chamber.

A still further advantage results from the provision of a generator built up from a plurality of sections of steel tubing having relatively thin walls and which are welded to each other at the junctions between the sections to form a continuous, homogeneous and flexible structure, which will withstand high temperature, and which will permit of unequal expansion and contraction, as well as flexing stresses, caused by the movement of the automobile, without opening up at the joints.

The specific features of the burner and water gauge are claimed in United States Letters Patents issued to me on applications filed as of even date herewith No. 1,427,449, dated August 29, 1922, and No. 1,485,492, dated March 4, 1924.

Having now fully described my invention, what I claim and desire to protect by Letters Patent is:

In a power plant, a furnace, a boiler arranged to be heated by the products of combustion from the furnace, a heat interchanger arranged to be heated by the products of combustion from the furnace and comprising two tubes, one of which is of relatively small cross-section and the other of which is of relatively large cross-section, joined together in external surface contact with each other, and means for causing liquid to flow from a supply through the larger tube of said heat interchanger into the boiler and for causing fluid to flow from said boiler through the smaller tube of said heat interchanger to the liquid supply, whereby the liquid entering the boiler is heated both by the fluid leaving the boiler and by the products of combustion.

In testimony of which invention, I have hereunto set my hand, at Wilmington, Delaware, on this 28th day of March, 1921.

FRANCIS I. DU PONT.